July 10, 1962 J. C. KOCI 3,043,593

ELECTRIC CIRCUIT FOR CONTROLLING THE PLAYING AND SCORING OF REGULATION BOWLING

Filed Oct. 29, 1958 7 Sheets-Sheet 1

INVENTOR.
JERRY C. KOCI
BY Edward C. Threedy
HIS ATTORNEYS.

INVENTOR.
JERRY C. KOCI
BY Edward C. Threedy
HIS ATTORNEYS.

INVENTOR.
JERRY C. KOCI
BY
Edward C. Threedy
HIS ATTORNEYS.

INVENTOR.
JERRY C. KOCI
BY
Edward C. Threedy
HIS ATTORNEYS.

INVENTOR.
JERRY C. KOCI
BY Edward C. Threedy
HIS ATTORNEYS.

July 10, 1962 J. C. KOCI 3,043,593

ELECTRIC CIRCUIT FOR CONTROLLING THE PLAYING AND SCORING OF REGULATION BOWLING

Filed Oct. 29, 1958 7 Sheets-Sheet 6

INVENTOR.
JERRY C. KOCI

BY Edward C. Threedy
HIS ATTORNEYS.

July 10, 1962 J. C. KOCI 3,043,593

ELECTRIC CIRCUIT FOR CONTROLLING THE PLAYING AND SCORING OF REGULATION BOWLING

Filed Oct. 29, 1958 7 Sheets-Sheet 7

INVENTOR.
JERRY C. KOCI
BY Edward C. Threedy
HIS ATTORNEYS.

3,043,593
Patented July 10, 1962

3,043,593

ELECTRIC CIRCUIT FOR CONTROLLING THE PLAYING AND SCORING OF REGULATION BOWLING

Jerry C. Koci, Barrington, Ill., assignor to Chicago Dynamic Industries Inc., Chicago, Ill., a corporation of Illinois Filed Oct. 29, 1958, Ser. No. 770,361
1 Claim. (Cl. 273—43)

This invention relates to new and useful improvements in an electric circuit for controlling the playing and scoring of regulation bowling.

A principal object of this invention is to provide an electric circuit for registering and reporting the conventional score attained in the playing of a regulation bowling game.

Another object of this invention is to provide an electric circuit which in addition to registering the score of a regulation bowling game, will indicate the player who is to bowl.

Yet another object of my invention is in the provision of an electric circuit which is to cooperate with the automatic pin setting mechanism normally employed in the playing of a regulation bowling game.

Other objects will appear hereinafter.

The invention consists in the novel combination and arrangement of parts to be hereinafter described and claimed.

The invention will be best understood by reference to the accompanying drawings showing the preferred form of construction, and in which.

The electric circuit to be hereinafter described is adapted to be used in conjunction with an automatic pin setting apparatus such as is shown and described in United States Letters Patent No. 2,559,274.

Included in this circuit is a scoring motor M. Connected to the shaft of this scoring motor M is a series of cams A, B and C. Adapted to be closed by these cams are a plurality of switches hereinafter described.

Included in the circuit and appropriately energized by such circuit is a plurality of step-up units of the type shown and described in United States Letters Patent No.

2,281,262, there being a step-up unit for indicating the particular player whose score is to be registered; a step-up unit to indicate the frame of the bowling game; a step-up unit for a score; and a step-up unit for indicating a strike or spare; and a tenth frame step-up unit. Each of these step-up units and their functions will be more fully described hereinafter.

Figure 5:
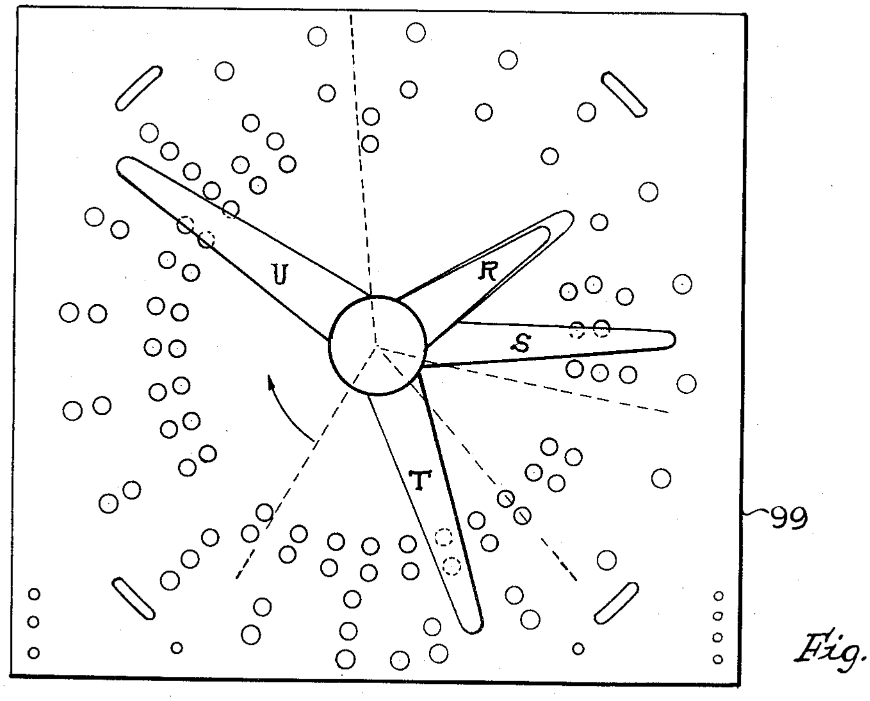
FIG. 5 is an elevational view of the motor scoring disc of my invention.
Figure 6:
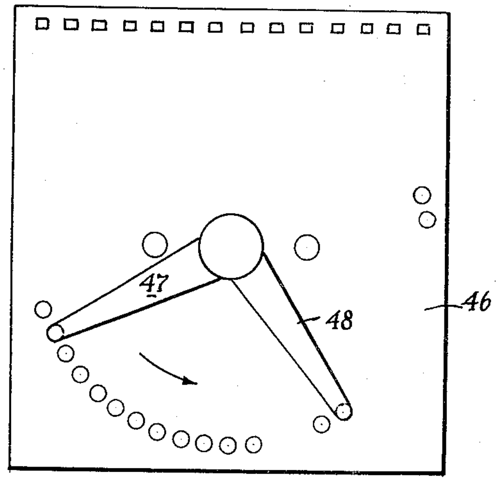
FIG. 6 is an elevational view of the frame unit disc and wiper arms as employed in the circuit.
Figure 7:
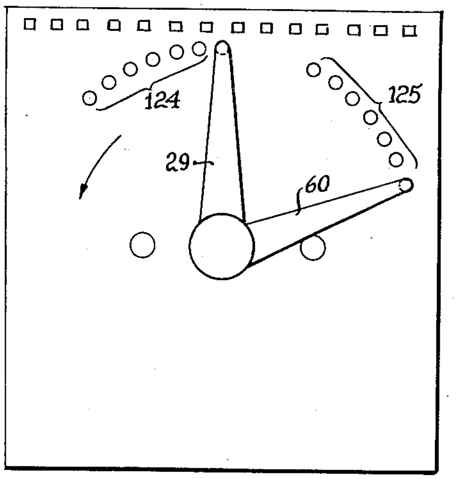
FIG. 7 is a tenth frame step-up disc as employed in the circuit.
Figure 14:
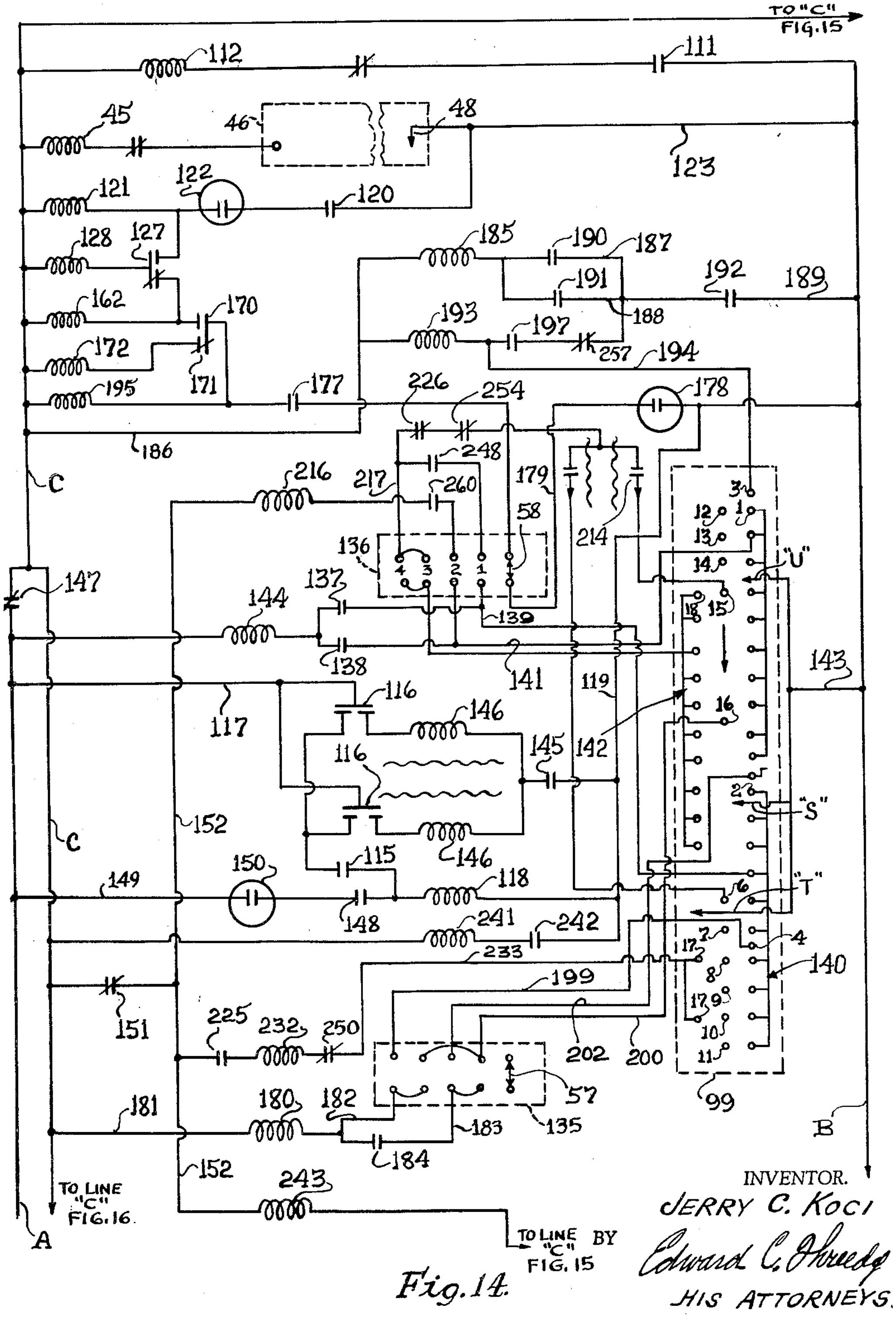
FIG. 14 is a fragmentary and schematic view of the electric circuit of the invention.
Figure 15:
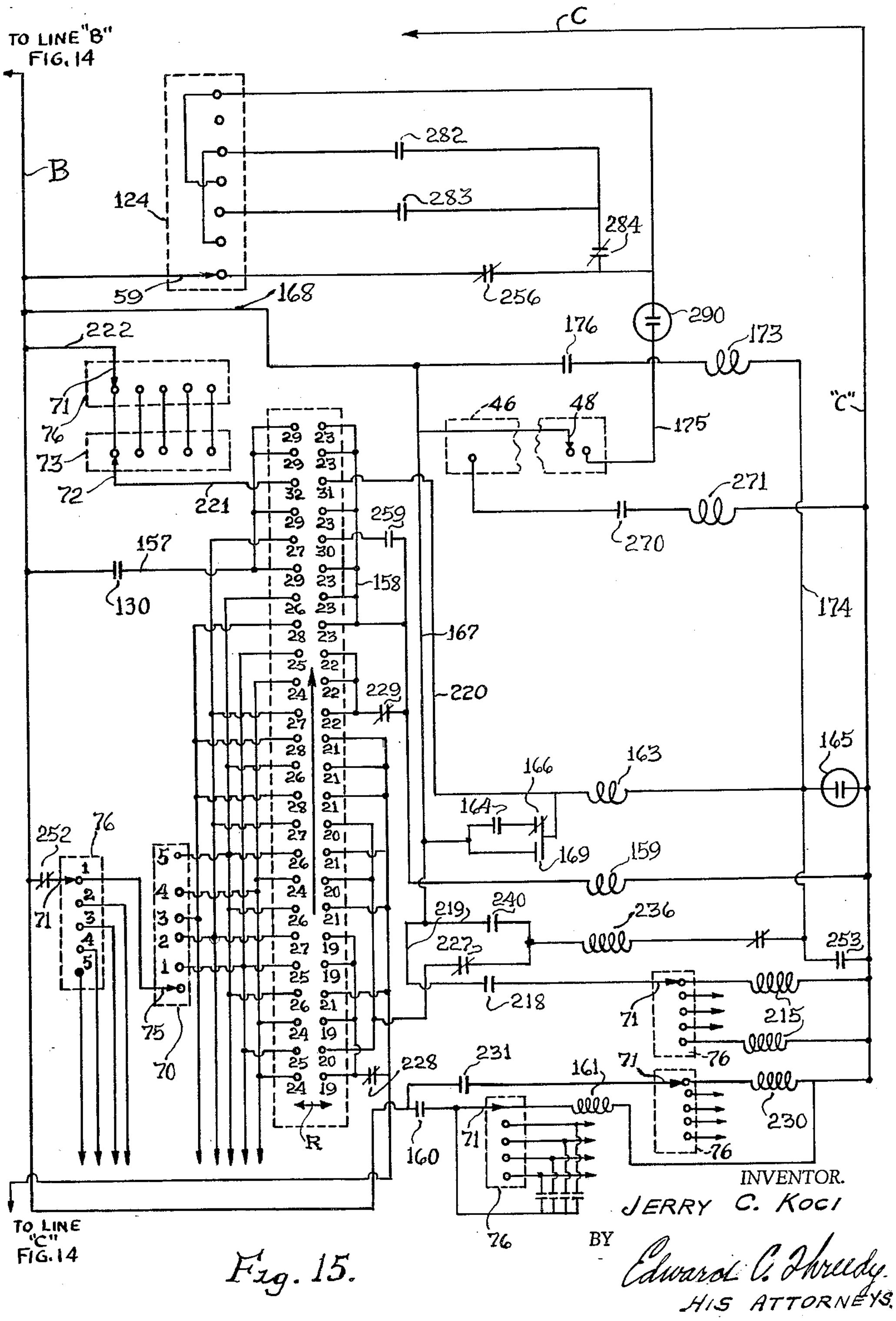
FIG. 15 is a fragmentary and schematic view of the electric circuit of the invention.
Figure 16:
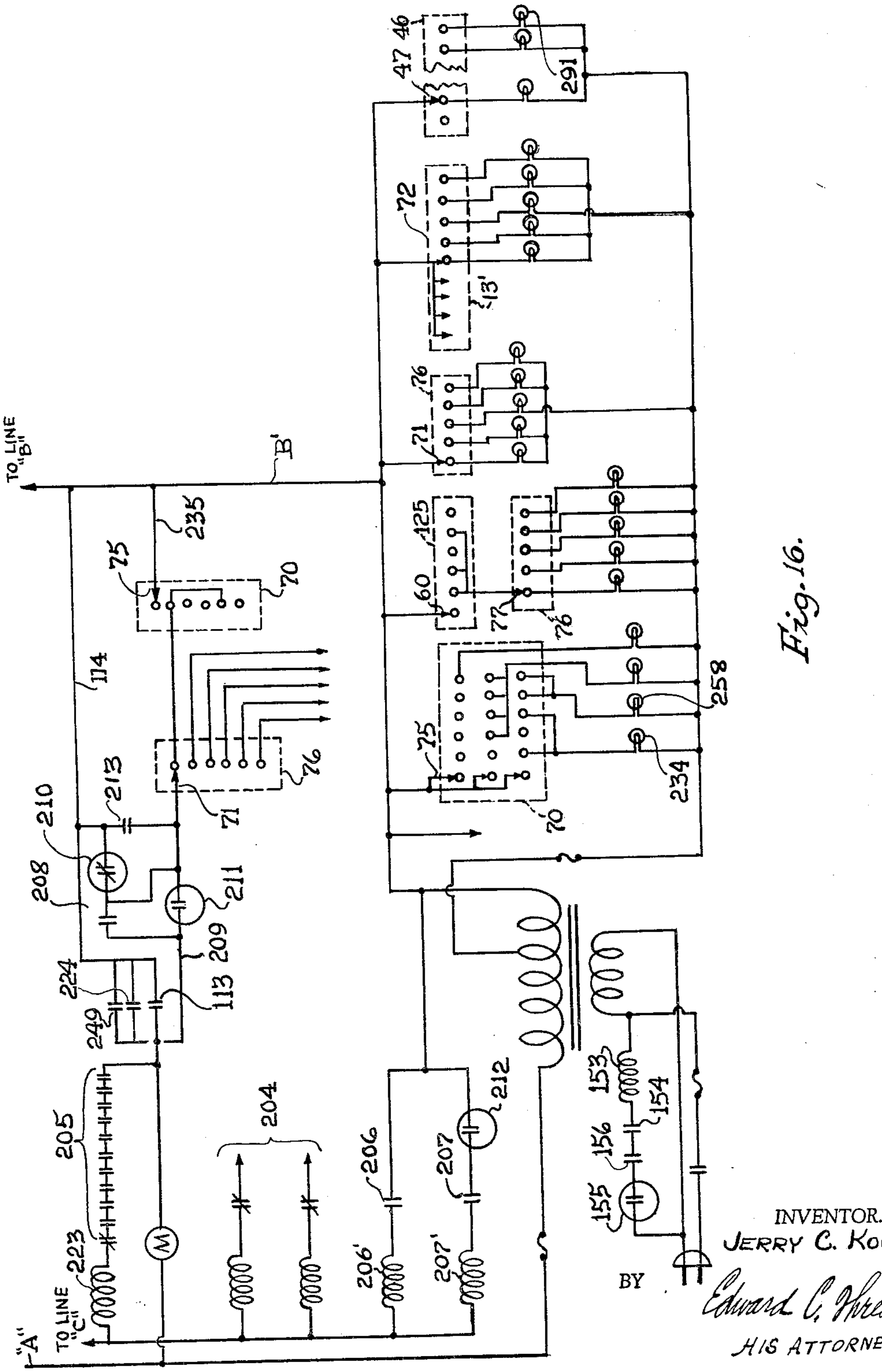
FIG. 16 is a fragmentary and schematic view of the electric circuit of the invention.

Each of these step-up units operates a wiper arm arrangement the wiper arm of which is adapted to pass over a plurality of contacts. These wiper arm arrangements and their associate contacts are shown in FIGS. 14, 15 and 16. The score motor M also rotates a plurality of wiper arms R, S, T and U, over a score disc as illustrated in FIG. 5.

Figure 1:
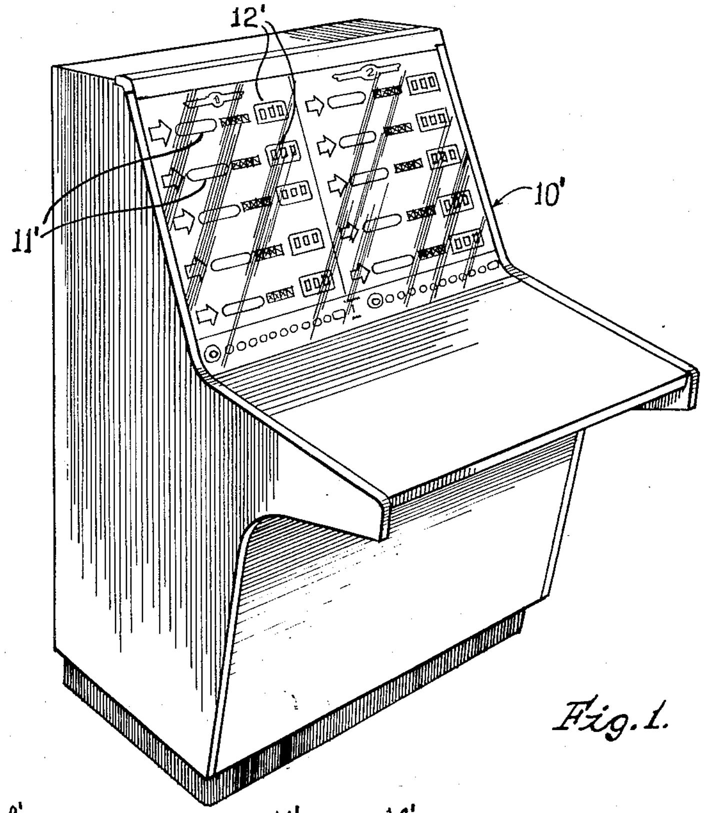
FIG. 1 is a perspective view of the scoring cabinet which contains the components making up the electric scoring circuit.

The circuitry and its associated parts are housed in a scoring cabinet 10' as shown in FIG. 1, there being a cabinet for every two adjacent bowling alleys. The cabinet indicates each alley it is to be associated with and provides spaces 11' thereon for the names of each player. Such cabinet also provides a plurality of apertures 12' through which the player's score may be indicated. There are provided two rotary type switches 13' for indicating the number of players for each alley, there being also provided indicators 14' for each alley and a switch 15' for regulating the type of play to be employed on the alleys. This latter switch permits the score circuit and its associated apertures to be employed in regulation bowling league play. Under such regulations, it is provided that each team takes turns bowling on alternate alleys, i.e., team No. 1 will start on alley 1 and bowl the odd frames thereon and will bowl the even frames on alley 2.

Referring now to the circuit, it is apparent that the first condition that the circuitry must perform is to reset a previous scoring condition and to reset the apparatus to a certain position. To do so five condition must be established. The frame indicator must be returned to its starting or No. 1 position. The player indicator must be returned to the first player position. Any strikes or spares that are indicated on the scoring panel must be removed, and all scores returned to zero, and the 10th frame step-up unit reset to a zero position.

In order to accomplish these conditions, the frame step-up, the player step-up, the score step-up and the strike-spare step-up must be reset to zero. The frame step-up, the player step-up units, and the tenth frame step-up unit are of the type that upon being appropriately energized, through a reset coil, will return to zero, while the count step-up and strike-spare step-up units are of the type that will return to zero through a step-by-step procedure.

For the sake of immediately explaining the preliminary circuitry, we will have the circuit indicate a single player on a single alley. To reset the circuitry to its initial condition, the reset button 111 is manually closed to establish a circuit to a start relay 112, such circuit being from line C through the relay 112 the closed reset button 111, to line B. The energization of the start relay 112 will close the start relay switch 113 thereby energizing the score motor M through a circuit from line A', scoring motor M, start relay switch 113, line 114 to line $B_2$. The score motor M will be energized to rotate through a 360° cycle.

The start relay 112 will also close a second start relay switch 115. The switch 115 is in circuit with the score indicators and if a score is indicated, a normally open zero position switch 116 carried by such indicator will be closed. Each of the switches 116 of each score indicator normally being open when the indicator reads zero or no score. If a score is indicated, a circuit is completed through line A', through line 117, the closed score indicator switch 116, the closed start relay switch 115, through a score reset lock relay 118, through line 119 to line B. This circuit will remain until the score indicator reaches zero at which time the switches 116 will have returned to their zero position and be normally opened.

When the score reset lock relay 118 is energized by reason of the circuit through the score indicator switch 116 and the closed start relay switch 115, two score reset lock relay switches 137 and 138 will be closed. The closed score reset lock relay switch 137 will be connected by line 139 to a plurality of contacts 140 on the motor scoring disc 99. The now closed score reset lock relay switch 138 by line 141 will be connected to a plurality of contacts 142 on the motor scoring disc 99. These series of contacts 140 and 142 are adapted to be engaged successievly by the wiper arm U of the motor scoring disc as it travels thereover due to rotation of the score motor M, and as the wiper arm U is connected by line 143 to line B′, such contacts 140 and 142 are "hot." In resetting the scoring indicators to their starting position, they are stepped down until the zero number is indicated at which time each of the switches 116 associated therewith will open, deenergizing the circuit to each of the score indicators. Each time the wiper arm U of the motor scoring disc engages one of the contacts in the 140 and 142 series, a score reset relay 144 will be energized. This score reset relay is energized through a circuit from line A′, through the score reset relay 144, through the now closed reset lock relay switches 137 and 138, and lines 139 and 141 respectively, the contacts 140 and 142, the wiper arm U, and line 143 to line B′. Each time the score reset relay 144 is energized, it will close a score reset relay switch 145 which in turn energize the score reset coil 146 to step down its indicator until such indicator reaches zero. The latter circuit for energizing the score coil 146 is from line A′, through line 117, the closed score indicator switch 116, the score coil 146, the periodically closed score reset relay switch 145, line 119 to line B′. Thus the score indicators are reset until their zero position is reached.

When the score reset lock relay 118 has been energized as heretofore described, it will open a normally closed score reset lock relay switch 147 in line A′. The opening of this score reset lock relay switch 147 will disrupt the power line C and prevent energization of any components connected thereto. The score reset lock relay 118 will also close a score reset lock relay switch 148 which will maintain the energization of the score reset lock relay 118 through a circuit from line A′ through line 149, through a now closed cam motor switch 150, the now closed score lock relay switch 148, the score reset lock relay 118, line 119 to line B′.

After the power line C′ is again energized by the closing of switch 147, a frame unit reset coil 121 can be energized. This coil 121 has in its circuit a start relay switch 120 and a motor cam AB operated switch 122. This switch 122 will be closed by the rotation of cam AB and when closed will energize the frame unit reset coil 121 through a circuit from line C′, the frame unit reset coil 121, the cam closed switch 122, the start relay 120, line 123 to line B′. The energization of such frame unit reset coil 121 will reset the wiper arms 47 and 48 of the frame step-up unit 46 to their original position.

When wiper arm 48 is thus reset to its zero position on the frame step-up unit 46 it will break the circuit to a game over relay 45, which was completed when the wiper arm 48 was on the contact thereof and which relay 45 will then cause actuation of a number of its own switches hereinafter identified.

Figure 10:
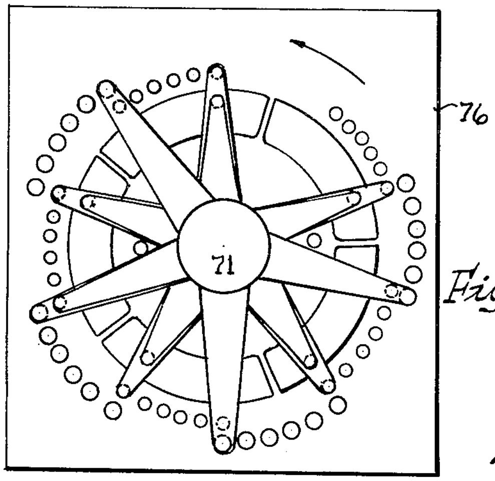
FIG. 10 is an elevational view of the player control step-up disc as employed in the invention.
Figure 11:
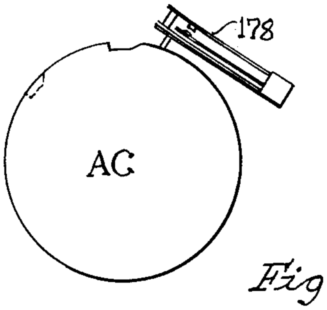
FIGS. 11 through 13 are motor cams and associated switches as employed in the circuitry.
Figure 12:
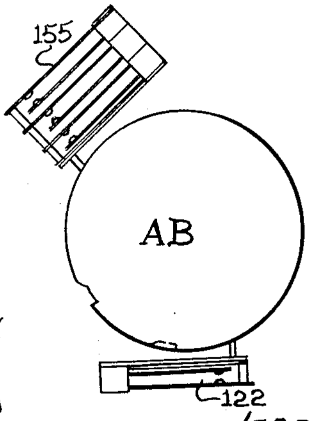
Figure 13:
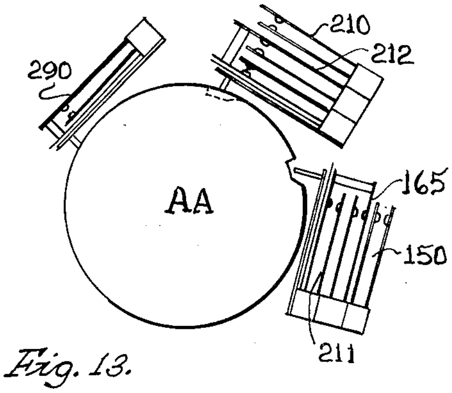

The start relay 112 will also close a start relay switch 127 which will establish the circuit to a player reset coil 128 through line C′, the player reset coil 128, the now closed start relay switch 127, the closed cam AB switch 122, the closed start relay switch 120, line 123 to line B′. This will reset the player indicator to indicate that the first player is up. The energization of the player reset coil 128 will cause the wiper arms 71 (see FIG. 10) to return to their original starting position.

When the start relay 112 was energized, it immediately opened a start relay switch 151 which interrupted a circuit from line C′ to line 152, this for a purpose hereinafter made apparent.

It should be noted at this time that all of the start relay switches which have been mentioned, and which will hereinafter be mentioned, are of the type that must be mechanically reset, in other words, once they open or close by reason of the energization of the start relay 112, they will remain in such operated position until they are mechanically restored. These switches are restored by the energization of a switch bank reset coil 153. This coil 153 has in its line circuit a normally closed score reset lock relay switch 154 and a motor cam AB switch 155 together with a score control relay switch 156. In order for the switch bank reset coil 153 to be energized, the score reset lock relay switch 154, and the score control relay switch 156 must be closed, as well as the motor cam AB switch 155. As long as the switch bank reset relay 153 is not energized the start relay switch 113 will remain closed and the score motor M will be energized, thus it is possible to have the score motor M energized for more than one cycle of operation. As heretofore set forth, the score reset lock relay 118 has been energized by reason of the closed start relay switch 115 and the closed score indicator switch 116. The score reset lock relay 118 once energized closes its own switch 148 and through the closed motor cam AA switch 150 remains energized even after the opening of the score indicator switch 116. This condition exists until the motor cam AA switch 150 is opened. As this latter switch is closed immediately by the rotation of the shaft of the score motor M, the score reset lock relay 118 will not be deenergized until the score motor M is returned to its normal position. However, by reason of the energization of the score reset lock relay 118, its switch 154 was open preventing the switch bank coil 153 from being energized and thus the start relay switch 113 in the circuit to the score motor M is still closed and the score motor M will continue to rotate. However, when the score motor M had reached its original position, the motor cam AA switch 150 opened and deenergized the score reset lock relay 118 closing its switch 154. As the score reset lock relay 118 was deenergized by the opening of switch 150 it will not be re-energized even though the score motor M in its second cycle again closes switch 150, because the score reset lock switch 148 has now opened due to the deenergization of its relay 118. Under these circumstances, when the motor cam AA switch 155 is now closed the switch bank reset coil 153 will be energized and all the start relay switches will be returned to their normal position.

Figure 8:
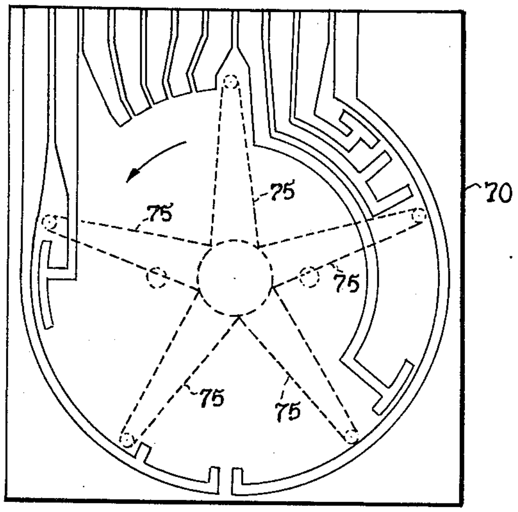
FIG. 8 is an elevational view of the player strike-spare step-up disc as employed in the invention.
Figure 9:
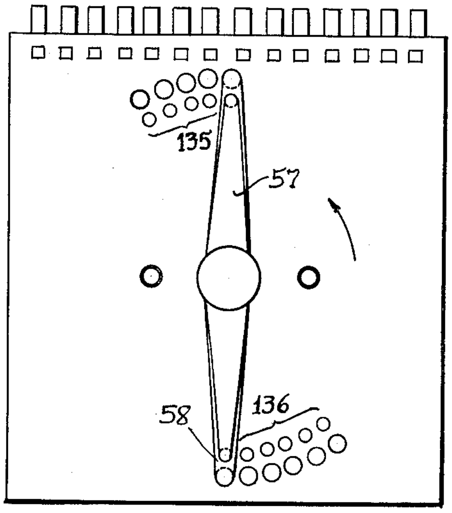
FIG. 9 is an elevational view of the score strike-spare count disc as employed in the invention.

Before the above condition takes place, it is necessary to reset the strike-spare step-up units 70 (see FIG. 8). The circuit for accomplishing this is through a start relay switch 130. This start relay switch 130 is connected by line 157 to a series of contacts 23—29. The contacts 23—29 will be engaged by the wiper arm R of the motor scoring disc 99 and will connect such contacts to corresponding contacts in line 158. This line 158 is in turn connected to a strike-spare reset coil 159, which coil is in turn connected to line C′. Thus the energization of the strike-spare reset coil 159 will take effect when the wiper arm R successively engages each contact of the series of contacts 23—29. The circuit thus established is from line C′ through the strike-spare reset coil 159, line 158, contacts 23—29, line 157, the closed start relay switch 130 to line B′. The energization of the strike-spare reset coil 159, each time the wiper arm R of the motor scoring disc 99 engages the contacts 23—29, will result in the closing of a strike-spare reset relay switch 160. Each time the strike-spare reset relay switch 160 is closed, it will energize the strike-spare step-up reset relay 161, the circuit for such relay 161 running from line C through the strike-spare step-up reset relay 161, the periodically closed strike-spare reset relay switch 160 to line B'. The strike-spare step-up unit 70 is the type that must be reset step-by-step. We will assume that the last player has left indicated on the strike-spare indicator three strikes. Under such circumstances, all of the wiper arms 75 of each of the strike-spare step-up units 70 would be on the fourth contact of the scoring disc associated therewith, for reasons hereinafter explained. These wiper arms 75 will be reset to the zero contact step-by-step each time the strike-spare step-up reset coil 161 is energized. Thus when the wiper arm R of the motor scoring disc 99 engages the first of the contacts 23—29 the strike-spare reset coil 159 will be energized closing the strike-spare reset switch 160, and by the closing of this switch 160, the strike-spare step-up reset relay 161 is energized retracting the wiper arms 75 of the strike-spare step-up units 70 from the fourth contact to the third contact. When the wiper arm R of the motor scoring disc engages the second contact 23—29 by the circuit just described, the wiper arms 75 of the strike-spare step-up units 70 will be retracted from the third contact to the second contact. The same result is accomplished when the wiper arm R of the motor scoring disc 99 engages all the contacts 23—29. Thus the strike-spare step-up units 70 are reset to their zero position and the indicators thereof are blank.

Referring to the illustration of the wiper arms 47 and 48 of the frame step-up unit 46, it will be seen that when the frame step-up unit 46 has been reset, the wiper arms 47 and 48 thereof will be on the zero contact. The circuit up to this point has been reset so that there are no strikes, spares, or score indicated, and the player control indicates that the No. 1 bowler may now commence to play. It now becomes necessary to indicate that the device is ready for play in the first frame. To accomplish this it requires energizing the frame step-up coil 162. The circuit for energizing the frame step-up coil 162 is responsive to a player control relay 163. Such player control relay 163 is energized by the closing of a start relay switch 164, and the closing of a motor cam AA operated switch 165. The circuit for the player control relay 163 being from line C' through the now closed motor cam AA switch 165, player control relay 163, a normally closed player control relay switch 166, the closed start relay switch 164, line 167, line 168 to line B'. Immediately upon energization of the player control relay 163, the player control relay switch 166 is opened and its corresponding switch 169 is closed maintaining the circuit to the player control relay 163. The energization of the player control relay 163 will in turn close the normally open player control relay switch 170 which is in circuit with the frame step-up coil 162. The energization of the player control relay 163 will open the normally closed player control relay switch 171 which is in circuit to a player control step-up coil 172. The closing of the motor cam AA switch 165 will cause the tenth frame control relay 173 to become energized. The circuit for energizing the tenth frame control relay 173 is from line C' through the now closed motor cam AA switch 165, through line 174, the tenth frame control relay 173, line 175, through the wiper arm 48 of the frame step-up unit which is now on the "0" contact, line 167, line 168 to line B'. The energization of the tenth frame control relay 173 will cause it to close a tenth frame control relay switch 176 thereby maintaining energization of the tenth frame control relay 173 which will also close the tenth frame control relay switch 177. This latter switch 177 is in circuit with the player control relay switch 170 and the frame step-up coil 162 and line C'. The other side of the 10th frame control relay switch 177 is connected to the "0" contact on a strike-spare count step-up disc. When the wiper arms 57 and 58 of the strike-spare count step-up disc have been reset to be in contact with the "0" contact in a manner hereinafter described, and a motor cam AC operated switch 178 is closed, a circuit to the frame step-up coil 162 will be established. This circuit is from line C' through the frame step-up coil 162, the now closed player control relay switch 170, the now closed tenth frame relay switch 177, the wiper arm 58 of the strike-spare count step-up disc being on the "0" contact, line 179, through the now closed motor cam AC switch 178 to line B'.

To reset the wiper arms 57 and 58 of the strike-spare count step-up discs 135 and 136, I employ a score strike-spare count reset relay 180. This score strike-spare count reset coil 180 is connected to the power line C by line 181 and to contacts 3 and 4 of the score strike-spare count step-up disc 135 by line 182. The score strike-spare count reset coil 180 is connected to contacts 1 and 2 of the score strike-spare count step-up disc 135 by line 183. However, this line 183 has in it a normally open strike-spare count relay switch 184 which is adapted to be actuated by a strike-spare count relay 185. This strike-spare count relay 185 has one side connected to the power line C through line 186. The opposite side of this relay 185 is connected to the power line B' through lines 187 and 188 and line 189. The line 187 has a normally open strike-spare count relay switch 190, while the line 188 has a normally open blow strike-spare count relay switch 191 and the line 189 has a zero position switch 192. If the wiper arms 57 and 58 of the score strike-spare count step-up discs 135 and 136 are off the zero position and on any of the contacts 1—4, the zero position switch 192 in line 189 will be closed. In order to energize the strike-spare count relay 185, it becomes necessary to close the normally open blow strike-spare count relay switch 191 in line 188. To do so, the blow strike-spare count relay 193 must be energized. This relay 193 has one side thereof connected by line 186 to the power line C'; the other side of the relay 193 is connected by line 194 to a contact 3 on the motor scoring disc 99. Thus when the wiper arm U of the motor scoring disc 99 engages the contact 3, such wiper arm U through line 143 will connect the relay 193 to the opposite power line B' thereby energizing the blow strike-spare count relay 193. The energization of the relay 193 will in turn close the normally open blow strike-spare count relay switch 191 energizing the strike-spare count relay 185. Both the strike-spare count relay 185 and blow strike-spare count relay 193 will close their own normally open switches 190 and 191 and 197 to create a holding circuit for each of the relays. The energizing of the strike-spare count relay 185 will close the strike-spare count relay switch 184 in the circuit of the score strike-spare count reset coil 180. Thus for the sake of illustration, if the wiper arm 57 of the score strike-spare count step-up disc 135 bridges the No. 4 contacts on such disc 135, it will be connected to the contact 4 on the motor scoring disc 99 through line 199, and thus the score strike-spare count reset coil 180 will be energized causing the wiper arm 57 to be retracted one step so as to bridge the No. 3 contacts of disc 135. One side of No. 3 contacts is connected by line 200 to a contact 16 on the motor scoring disc 99. When the wiper arm S of such motor scoring disc 99 engages the contact 16, the reset coil 180 is again energized retracting the wiper arms 57 of the strike-spare count step-up disc 135 to the No. 2 contact. The No. 2 contact is connected by line 202 to a contact 5 on the motor scoring disc 99 and when the wiper arm U of the motor scoring disc engages the contact 5, the reset coil 180 will again be energized, this time through line 183 and the now closed strike-spare count relay switch 184 to retract the wiper arm 57 of the score strike-spare count step-up disc 135 to the No. 1 contact. This No. 1 contact of the strike-spare, count step-up disc 135 like the No. 3 contact is connected by line 200 to contact 16 on the motor scoring disc 99 and when such contact is engaged by the wiper arm S of the motor scoring disc, it will energize the reset coil 180 causing the wiper arm of its corresponding step-up to be retracted to the zero position. At said zero position of the wiper arms 57 and 58 of the strike-spare count step-up discs 135 and 136, the zero position switch 192 will open deenergizing the strike-spare count relay 185 and the blow strike-spare count relay 193.

In conditioning the circuit for playing, it requires that the wiper arms 59 and 60 of the tenth frame step-up units 124 and 125 (FIGS. 15 and 16 respectively) be returned to their zero position. The step-up units for the tenth frame step-up are of the type that will return to its original or zero position upon being energized once. To reset the wiper arms 59 and 60, I provide a tenth frame reset coil 195. The tenth frame reset coil 195 is energized when the tenth frame control relay switch 177 is closed and the wiper arm 58 of the strike-spare count unit 136 is on its zero position and the motor cam switch 178 is closed. The tenth frame control relay switch 177 is closed because the tenth frame control relay 173 is energized. The tenth frame control relay 173 is energized through a circuit from line C′, the closed motor cam AA switch 165, line 174, tenth frame control relay 173, line 175, the zero position of the frame unit, wiper arm 48, line 168 to line B′. The wiper arm 48 of the frame step-up unit 46 is on the zero position and remains there until the frame step-up coil 162 is energized in a manner hereinbefore described. Thus the circuitry has been completely reset now awaiting scoring impulses.

*Scoring Operation*

This apparatus together with its circuit is adapted to be associated with an automatic pin setting device. In such device, there are what is termed "pin cells" which receive bowling pins to be spotted on the alley. Each of these cells include a switch which is in turn connected by suitable conduits to a plurality of pin relays 204. When in the operation of bowling, certain switches in the pin cells are actuated, they in turn will cause energization of their respective pin relays 204 when energized. These pin relays will in turn close their respective relay switches 205. The function and operation of which will be hereinafter made apparent.

Associated with the automatic bowling pin spotting apparatus is a normally open switch located in the alley and which switch will be closed by the presence or bowling of a ball on such alley. The closing of this switch wil lin turn energize either a first shot relay 206 or a second shot relay 207 depending upon the condition of the circuit.

We will now assume that the circuit is ready to receive its first scoring impulse and that all the switches and contacts are in their position and condition as shown in the circuit drawings FIGS. 14, 15 and 16.

For the sake of this initial description, we will assume that there is but one player bowling on but one alley. In this description, we will presume that the bowler will bowl two balls and get a scoring count i.e., he will not achieve either a spare or a strike.

When the bowler bowls the first ball, such ball will close the impulse switch 206 associated with the automatic pin spotter. The closing of such switch 206 will in turn energize the first shot relay 206. This relay 206′ will close the first shot relay switch 208 thereby completing a circuit for energizing the scoring motor M. Such circuit for energization of the motor M being from line A′, through the score motor M, line 209, the now closed first shot relay switch 208, the closed motor cam AA switch 210, line 114, to line B′. The scoring motor M will be energized until the motor cam AA switch 210 is opened by its respective cam. This will take place after the motor M has rotated through approximately 30° of its rotation. By said partial rotation of the scoring motor M, the wiper arms R, S, T, and U of the motor scoring disc 99 will be moved to the dotted line positions as seen in FIG. 5. During this rotation of the wiper arms, the wiper arm R on the motor scoring disc will engage the first three series of contacts to wit: contacts 24—19, contacts 25—20 and contacts 24—19; on the motor scoring disc 99. However, these contacts are not "hot" because they are connected to certain contacts on the strike-spare step-up disc 70 which contacts are not engaged by the wiper arm 75 of such step-up disc. Therefore no scoring impulse has been given to the circuit. When the score motor M initially rotated so that it opened motor cam AA switch 210, it closed motor cam AA switch 211, motor cam AA switch 165, and motor cam AA switch 150. This latter switch however, having no function in the scoring operation of the circuitry and is only utilized in the resetting of the circuit as heretofore explained.

By the partial rotation of the motor M, a motor cam AA switch 212 is closed. This motor cam AA switch 212 is in circuit with the second shot relay 207′ so that when the bowler throws the second ball which closes the impulse switch in the alley, the second shot relay 207′ will be energized. The energization of this second shot relay 207′ will close a normally open second shot relay switch 213. The closure of this second shot relay switch 213 will cause the energization of the scoring motor M. This through a circuit from line A′, the scoring motor M, line 209, the now closed motor cam AA switch 211, through the now closed second shot relay switch 213, line 114 to line B′. The scoring motor M will remain energized until the motor has completed its full cycle of rotation which is approximately another 330 degrees at which time the motor cam AA switch 211 will open to deenergize such motor. In completing its rotation, the scoring motor M will cause the wiper arms R, S, T and U to continue to pass over the motor scoring disc 99 and return to its initial position. For the sake of an example, let us say that the bowler in bowling two balls was successful in knocking over nine pins, being pins 1 through 9. As such the switches in the pin cells have been actuated and the corresponding pin relays 204 of pins 1 to 9 have been energized. The energizing of the pin relays 204 will in turn energize respective pin relay switches 214. The closing of any of these pin relay switches 214 will in turn place in a "hot" condition corresponding rivets on the motor scoring disc 99. Thus when the wiper arm S of the motor scoring disc 99 engages these rivets, it in turn will energize a score step-up coil 215, it being noted in FIG. 15 that there is a score step-up coil 215 for each of the five contacts on the player control unit 76. The circuit through the "hot" rivets is as follows: from line C through the now closed start relay switch 151, line 152, through a score relay 216, line 217, through the then closed pin relay switches 214, through the "hot" contacts on the motor scoring disc, the wiper arms R, S, and T of such disc, line 143 to line B′. In this latter circuit, the score relay 216 has been energized. The energization of the score relay 216 in turn closes a score relay switch 218 which is in circuit to the score relay step-up coil 215. The circuit for energizing the score step-up coil 215 is from line C′ through the coil 215, the now closed score relay switch 218, line 219, line 167, line 168, to line B′. It is thus apparent that the score relay 216, if as in this example, nine pins have been knocked down will be energized nine times in turn energizing the score step-up coil 215, nine times making the score indicator show a nine pin count. Thus the bowler has now completed bowling in the first frame and it requires now that the frame step-up coil 162 be energized to advance the wiper arms 47 and 48 of the frame step-up disc 46 to the second position to indicate the readiness of the circuit to receive a scoring impulse in the second frame. This is accomplished by first energizing the player control relay 163. This is energized from line C', through the closed motor cam AA switch 165, player control relay 163, line 220 through a certain pair of corresponding contacts 31 and 32 on the motor scoring disc 99 and arm R, through line 221 through the wiper arm 71 of the player control unit 76, a wiper arm 72 of a player selector unit 73, through line 222 to line B'. The energization of the player control relay 163 will now close the player control relay switch 170 which is in circuit with the frame step-up coil 162. The energization then of the frame step-up coil 162 is the same as heretofore described.

The pin relay switches 214 as well as the first shot relay switch 208 and the second shot relay switch 213 are of the type that must be mechanically reset and the resetting thereof takes place when the switch bank reset relay 153 is energized in a manner hereinbefore described.

*Spare*

We will now assume the position that the player will score a spare, that is knock down all ten pins with two balls. The operation of the circuit for the first ball is the same as was previously described whereby the player knocked down less than ten pins with said first ball. The wiper arms R—U of the motor scoring disc 99 are now in the first position or that indicated by the dotted lines in FIG. 5. No additional scoring has been indicated. The motor cam AA switch 211 has been closed. Upon the second shot, the motor will be energized through such closed motor cam AA switch 211 and the then closed second shot relay switch 213. Upon the bowling of the second ball, all the pin relays 204 will be energized thereby closing their appropriate pin relay switches 205 as well as their pin relay switches 214. The closing of the pin relay switches 205 will in turn cause the energization of a 1–10 relay 223. This relay is energized through the circuit from line C', relay 223, the closed switches 205, line 209, closed motor cam AA switch 211, the closed second shot relay switch 213, line 114 to line B'. The energization of the 1–10 relay 223 will cause a 1–10 relay switch 224 to be closed as well as a 1–10 relay switch 225. The energization of the relay 223 will cause a 1–10 relay switch 226 to open as well as a 1–10 relay switch 227 and will also cause 1–10 relay switches 228 and 229 to open. As the scoring motor M was energized by the closing of the second shot relay switch 213, the wiper arms R, S, T, and U of the motor scoring disc 99 commence their rotation from the first position and will pass over the contacts on such scoring disc 99. However, the contacts that would normally be placed in a "hot" condition by reason of the closing of the pin relay switches 214 are not so conditioned by reason of the opening of the 1–10 relay switch 226 which is in line 217 which in turn is connected to the pin relay switches 214. The opening of the 1–10 relay switch 226 prevents energization of the score relay 216 and thereby the score relay switch 218 is not closed and the score step-up coil 215 is not energized. As a spare has been scored, the strike-spare step-up coil 230 must be energized to step-up the wiper arms 75 from the zero contact to the first contact on the strike-spare step-up disc 70. In order to energize the strike-spare step-up coil 230, a player strike-spare step-up coil switch 231 must be closed. To close such switch 231 the player strike-spare step-up relay 232 must be energized. Such player strike-spare step-up relay 232 is energized through the circuit from line C', the closed start relay switch 151, line 152, the now closed 1–10 relay switch 225, through the player strike-spare step-up relay 232, line 233 to contacts 17 on the motor scoring disc 99 through the wiper arm T of the motor scoring disc when it engages the contacts 17, line 143 to line B'.

The energization of the player strike-spare step-up relay 132 closes the player strike-spare step-up relay switch 131 energizing the strike-spare step-up coil 130 through the circuit from line C', the coil 130, the wiper arm 71 of the player control disc 76, the now closed step-up relay switch 231 to line B'. The wiper arms 75 on the strike-spare step-up disc are now advanced to the first contact. As a spare has been achieved and registered, the spare light 234 will be lit so as to show that in the second frame a spare was scored but no additional score count is indicated at this time. This by reason of the fact that the spare must accumulate its 10 count value and add it to the total number of pins knocked down on the next shot. The frame step-up coil 162 is again energized as hereinbefore stated to now indicate that the bowler is in his third frame.

Upon the registration of a spare as above indicated, the circuit is once against placed in its original condition. The switch bank reset coil 152 has been energized breaking the circuit to the pin relays 204, breaking the circuit to the 1–10 relay 223 and restoring all of such relay switches back to their normal position as shown in the circuit.

As the bowler has achieved a spare in the second frame and is now bowling in the third frame, it becomes necessary to energize a scoring circuit which will result in indicating a score achieved on the first ball bowled in the third frame. The scoring circuit is as follows:

The wiper arms 75 of the strike-spare step-up unit are on the first contact. When the bowler bowls the first ball and knocks down less than all of the ten pins, the following will take place; the motor M will be energized in its normal manner and the wiper arms R, S, T and U will commence to pass over the motor scoring disc 99. The arm R will engage contacts 20—25 energizing a score control relay 236, which in turn opens a relay switch 156.

The scoring motor M will be energized to move the wiper arms past their first position by reason of the circuit that is established from a line A through the scoring motor M, line 209, the now closed motor cam AA switch 211, the wiper arm 71 of the player control unit 76 and the wiper arm 75 of the strike-spare step-up unit 70 on the first contact line 235 to line B'.

The score control relay 236 will open the score control relay switches 156 and 256 and close the relay switch 240. The arm S will commence to engage contacts 6—15 to energize the score relay 216 and the score step-up coil 215. The arm R will engage contacts 19—25 thereby energizing a score strike-spare count step-up relay 243 thereby closing a relay switch 242 energizing the score strike-spare count step-up coil 241 moving the arms 57 and 58 thereof to their first contact. The wiper arm R will next engage contacts 22—25 to energize the strike-spare reset coil 159 to reset the wiper arms 75 of the strike spare step-up unit 70 back to their zero contact. The wiper arm R will engage contacts 31—32 energizing the player control relay 163. However, as the wiper arms 57 and 58 of the strike-spare score count units 135 and 136 are off the zero position, the closing of the player control relay switch 170 will not effect energization of the frame step-up coil 162. The wiper arm U will engage the contact 3 thereby energizing the strike-spare count relay 185 and the blow strike-spare count relay 193. The motor will complete its first 360° cycle.

As the strike-spare count relay 185 was energized the strike-spare count relay switch 249 was closed, thus the scoring motor M is energized to commence a second revolution. As the score control relay switch 156 was opened, the switch bank reset coil 153 was not energized at the end of the first revolution of the scoring motor M. As the strike-spare count relay 185 has been energized, a relay switch 254 was open disrupting the circuit to the contacts 6—15 so these contacts will not cause energization of the score step-up 215. As the motor continues its second revolution, the wiper arm T will continue to pass over contacts 142 and as the wiper arms 57 and 58 of the score strike-spare count units 135 and 136 are on their first contact and the strike-spare count relay switch 248 is now closed, the score relay 216 and the score step-up 215 will be energized.

In the rotation of the wiper arms R, S, T and U over the motor scoring disc 99 when the arm S hits contact 16, the score strike-spare count reset coil 180 will be energized to reset the wiper arms 57 and 58 of the score strike-spare count units 135 and 136 back to their original position. This will deenergize strike-spare count relay 185 and the blow strike-spare count relay 193.

It should be noted that when the scoring motor M reached the end of its first revolution, the motor cam AA switch 165 was opened, this would normally deenergize the score control relay 236. However, the score control relay 236 was maintained energized by reason of the closed blow strike-spare count relay switch 253.

This relay switch 253 is now opened by reason of the deenergization of the blow strike-spare count relay 193 as above mentioned. However, the score control relay 236 will be maintained energized until the now closed motor cam AA switch 165 opens which will be when the motor reaches its original starting position. By this time the motor cam AB switch 155 will have been closed and reopened and because the score control relay switch 156 was opened the switch bank reset coil 153 was not energized.

The motor will continue to its original position ending the second revolution thereof. At this time the score step-up 215 has been energized a number of times which is equal to the score of the spare i.e., ten plus the number of pins which were knocked down on the first ball of this frame. If for an example 9 pins had been knocked down, the score step-up relay 215 would have been energized nineteen times.

Thus the motor has completed ts second full revolution. As this was the first ball after a registered spare a bowler is entitled to a second ball. In order to have the circuit conditioned for the second ball, the motor must continue until the wiper arms are in their first position. As the switch bank reset coil 153 has not been energized, the first shot relay switch 208 is still closed and thus the scoring motor M will be energized through such closed switch and until the motor cam switch 210 is opened.

The above described spare circuitry was taken in consideration that the bowler on the first ball of the third frame following the achieved spare, knocked down less than all of the ten pins. Following the above circuit conditions, two scoring situations may result; one being that on the second ball of the third frame the bowler knocked down less than all the remaining pins or the bowler succeeded in obtaining another spare. Let us assume the first scoring condition. The circuit is in the condition as shown in the FIGS. 14, 15 and 16.

When the bowler bowls his second ball, he will energize the scoring motor M as a result of the closing of the second shot relay switch 213. When the scoring motor M is thus energized the wiper arms R, S, T, and U of the motor scoring disc 99 will commence their rotation. The additional pin relays 204 that now have been energized by the knocking down of any additional pins will through the closing of their respective pin relay switches 214 place in a "hot" condition certain of the remaining contacts 6—15 on the motor scoring disc and such contacts will now be engaged by the wiper arm S, and they in turn will energize the score relay 216 as heretofore described and which in turn will energize the score step-up relay 215 in the manner hereinbefore described to indicate the additional score achieved by the second ball. During the rotation of the wiper arms over the motor scoring disc, the wiper arm R will engage the contacts 31—32 energizing the player control relay 163 which in turn conditions the frame step-up relay 162 to be energized when the motor cam AC switch 178 is closed thus stepping-up the step-up arms 47 and 48 indicating the next frame to be bowled. As heretofore mentioned, the score control relay 236 was deenergized and therefore when the motor cam AB switch 155 is closed, the switch bank reset coil 153 will be energized causing mechanical resetting of the first and second shot relay switches 208 and 213 and all the pin relay switches 214. The scoring circuit has now been returned to the original condition as shown in the figures and now awaits the first bowled ball in the fourth frame.

In considering the second scoring condition after achieving a pin count on a spare, the second ball bowled might knock down all the remaining pins thereby registering the score of another spare in the third frame. If such conditions exist, the moving of the wiper arm S over the contacts 6—15 of the motor scoring disc will not energize the score relay 216 because by energizing all of the pin relays 204, all the pin relay switches 205 have been closed thereby energizing the 1–10 relay 223. This relay 223 opens the normally closed 1–10 relay switch 226 which is in the line of the circuit between the pin relay switches 214 and their associated contacts 6—15 and the score relay 216. Therefore, no score will be indicated for the third frame but the spare light 234 must be energized. To step-up the wiper arms 75 of the strike-spare step-up units 70 from their zero position of their first contact, the strike-spare step-up coil 230 must be energized and it will be energized through the energization of the strike-spare step-up relay 232. The circuit for energizing the relay 232 is from the C′ through the closed start relay switch 151, the now closed 1–10 relay switch 225, the relay 232, line 233, one of the contacts 17 on the motor scoring disc 99, which contact will be engaged by the wiper arm T of the motor scoring disc 99 when such wiper arm commences to move from its first position over the motor scoring disc through line 143 to line B′. The circuit is now reset to its original condition as heretofore described with the exception that the wiper arms 75 of the strike-spare step-up units 70 are on the first contact and the circuit is conditioned to receive the scoring impulses from the first ball in the fourth frame.

We have described the circuitry whereby a pin count has followed a spare, and also the circuitry whereby a pin count and a second spare followed a spare. We will now describe the circuit whereby a strike follows a spare.

*Strike After Spare*

The circuitry for registering a strike after a spare has been achieved and which will result in indicating in the frame where the spare had been indicated, a score count of 20 and indicating in the frame being played a score of a strike is as follows:

The circuit is in its original condition with the exception that the wiper arm of the strike-spare step-up unit is on its first contact indicating the presence of a spare. On the bowling of the first ball, the scoring motor M will be energized in its normal manner and all the pin relays 204 will be energized thereby energizing the 1–10 relay 223. The energization of this 1–10 relay 223 will close the relay switches 224 and 225 and open the relay switches 226, 227, 228 and 229. The energization of the motor will cause the wiper arms R, S, T, and U to commence passing over the motor scoring disc 99. Wiper arm T will engage contact 17 and energize the strike-spare step-up relay 232 in a manner hereinbefore described moving the wiper arms 75 thereof to the second contact. The motor will continue to be energized past its first position until the wiper arm T engages the second contact 17 which will again energize the strike-spare step-up relay 232 moving the wiper arm 75 thereof to its third position. As the wiper arms continue to move over the motor scoring disc 99, the arm R will engage contacts 21—28 energizing the strike-spare count step-up relay 243 moving the wiper arms 57 and 58 thereof on to its first contact. The motor will continue to be energized and the wiper arm R will engage the second set of contacts 21—28 again energizing the strike-spare count step-up 243 moving the wiper arms 57 and 58 thereof to their third contact. The wiper arms will continue to rotate over the motor scoring discs until the arm R engages contacts 23—28 which will energize the strike-spare reset relay 159 moving the wiper arms 75 thereof back to the second contacts. As the wiper arms continue to rotate, the arm U will engage contact 3 energizing momentarily the blow strike-spare count relay 193 which in turn will energize the strike-spare count relay 185. The strike-spare count relay 185 will close its relay switch 190, 248, 249, 184 and open the strike-spare count relay switch 252. By closing the strike-spare count relay switch 260 and with the wiper arms 57 and 58 of the score strike-spare count unit on the second contact, the wiper arm U will commence to engage the No. 1 contacts on the motor scoring disc 99 energizing the score relay 216 in turn energizing the score step-up relay 215. The motor will return to its original position. As neither the score control relay switch 154 or the score reset lock relay switch 156 was open, when the motor cam AB switch 155 is closed, the switch bank reset coil 153 will be energized resetting all the pin relays 204 and their corresponding switches as well as the 1–10 relay 223 and its corresponding switches to their original position. However, as the strike-spare count relay switch 249 has been closed, the motor will continue to operate through a second revolution.

At the start of the second revolution, it must be remembered that the wiper arms 75 of the strike-spare step-up unit are on their second contacts and the wiper arms 57 and 58 of the score strike-spare count units are on their second contacts. The wiper arms R—U will continue to move over the motor score disc 99 with the arm U engaging the remaining No. 1 contacts energizing the score step-up relay 215 as hereinbefore described. Also because the strike-spare count relay 185 is energized, a relay switch 250 is open to disrupt the circuit to the player strike-spare step-up relay 232.

As the strike-spare count relay switch 252 is open, the contacts engaged by the wiper arm R are of no consequence as there is no complete circuit by reason of such open switch. After the wiper arm U has engaged the last No. 1 contact it will engage the No. 5 contact and this in turn will energize the score strike-spare reset coil 180 moving the wiper arms 57 and 58 of the score strike-spare count units 135 and 136 back to their first position. On such first position of the wiper arms 57 and 58 the series of contacts 140 are in a "hot" condition and when engaged by the arm U will energize the score step-up relay 215. As the wiper arm U moves off the last of the contacts 140 which has resulted in energizing the score-step-up 215 twenty times to indicate a score of 20 in the frame where the spare had been indicated, the wiper arm S will engage contact 16 which in turn will energize the score strike-spare count reset coil 180 moving the wiper arms 57 and 58 thereof back to their zero position. The wiper arm R had engaged contacts 31 and 32 energized the player control relay 163. This relay 163 in turn had closed the player control relay switch 170 and therefore when the tenth frame control relay switch 177 is closed and the wiper arms 57 and 58 of the score strike-spare count units 135 and 136 are on their zero position the frame step-up unit 162 will be energized in the manner hereinbefore described to step-up the wiper arms 47 and 48 of the frame units to indicated when the play is ready to be commenced in the next frame.

The circuitry for scoring a strike is as follows:

When the first ball is bowled, the scoring motor M will be energized in the conventional manner. This will start the wiper arms R, S, T and U in their movement over the motor scoring disc 99. The first ball will knock down all ten pins thereby energizing all of the pin relays 204 closing the corresponding pin relay switch 205, thus energizing the 1–10 relay 223. The energizing of the relay 223 will actuate the many switches associated therewith and each one will be described in detail as their incorporation in the circuit is shown.

The 1–10 relay switches 227 and 228 and 229 are opened and thereby interrupt most of the circuits to the contacts on the motor scoring disc 99 that would be engaged by the wiper arm R. The 1–10 relay switch 226 opens disrupting the circuit of the contacts 6 through 15 and their associated switches 214 thereby preventing energization of the score relay 216 and in turn the score step-up relay 215. A 1–10 relay switch 257 will be opened to prevent energization of the strike-spare count relay 185 and the blow strike-spare count relay 193. The 1–10 relay switch 225 will be closed thereby establishing a circuit for the strike-spare step-up relay 232. The other side of this relay 232 is connected by line 233 to two contacts 17 on the motor scoring disc. The 1–10 relay switch 224 is closed creating a circuit to the score motor M which by-passes the motor cam AA switch 210 and assures a complete 360° rotation of the motor. In such rotation of the motor, the wiper arm T will engage each of the contacts 17 thereby energizing the strike-spare step-up relay 232 twice, which in turn will energize the strike-spare step-up coil 230 twice causing the wiper arms 75 of such step-up units 70 to be advanced to the second contacts on such discs thereof. The player control relay 163 will become engaged when the wiper arm R engages contacts 32 and 31 of the motor scoring disc 99. The energization of the player control relay 163 will close the player control relay switch 170 which will cause the frame step-up coil 162 to be energized to step-up the wiper arms 47 and 48 indicating the next frame when the cam AC motor switch 178 is closed. The switch bank reset relay 153 will be energized by the closing of the motor cam switch 155 resetting all of the 1–10 relay switches and the pin relay switch 214 to their normal position. The circuit is now in its original condition with the exception that the wiper arms 75 of the strike-spare step-up units 70 are now on their second contacts and the strike light 258 is now illuminated. According to the regulation scoring for bowling, the player is entitled to a score of ten plus what he will achieve on the next two balls bowled. Three scoring conditions may exist; a pin count may follow the strike, the spare may follow the strike or another strike may follow.

The circuitry for a pin count following a strike is as follows: When the bowler bowls the first ball energizing the scoring motor M through the first shot relay switch 208, the wiper arms R, S, T and U begin their travel over the motor scoring disc 99 until they reached their first position at which time the scoring motor M is de-energized by the opening of the cam AA motor switch 210. No score has been indicated as such score does not result until two balls have been bowled. Upon the bowling of the second ball the score motor M is energized through the second shot relay switch 213. The wiper arms will commence their travel over the motor scoring disc 99. The wiper arm R will engage contacts 19—27 energizing the strike-spare count step-up relay 243 moving the wiper arms 57 and 58 of the score, strike, spare count units 135 and 136 thereof to their first contact. The wiper arm S of the motor scoring disc has meanwhile begun to engage contacts 6—15 to energize the scoring relay 216 through whatever pin relay switches 214 are closed. The energization of the score relay 216 energizes the score step-up relay 215 and commences to indicate a score. The wiper arms continue their rotation until the arm R wipes contacts 20—27 thereby energizing the score control relay 236. The score control relay 236 will open its score control relay switch 156 and 256 and will close the score control relay switch 240. The wiper arms will continue their rotation over the motor scoring disc until the contact R engages contacts 27—30 thereby energizing the strike-spare reset relay 159 through the now closed second shot relay switch 259. The energization of the strike-spare reset relay 159 will now cause the wiper arms 75 of the strike-spare step-up units 70 to return to the number 1 contacts thereon. The wiper arm R will next engage contacts 32—31 causing energization of the player control relay 163 in a manner hereinbefore described. The wiper arms will continue until the wiper arm U engages contact 3 thereby energizing the strike-spare count relay 185 and the blow strike-spare count relay 193. Each of these relays will close their appropriate switches which will be pointed out as need be in the description of the following circuitries. The wiper arms will continue to rotate to their original starting position.

The only score that has thus far been indicated is as a result of the wiper arm S passing over the contacts 6—15. Let us say for example that 9 of such contacts were "hot," therefore we have now an indicated score of nine. As the strike-spare count relay 185 has been energized, its corresponding strike-spare count relay switch 249 is closed thereby maintaining energization of the scoring motor M for a second cycle of rotation. However, before the second cycle begins it should be noted that the motor cam AA switch 165 had opened thereby deenergizing the player control relay 163.

Upon the second rotation of the scoring motor M, the same circuitries and functions of the parts energized thereby as was described in the operation of scoring of a pin count after a spare, is followed with the exception that the second shot relay switch 213 has been closed and has remained closed due to the failure of the switch bank reset relay 153 to be energized because of the fact that the score control relay 236 is energized, and the motor will thus be permitted to continue its rotations through a full second cycle.

During such second cycle of the motor M the energization of the strike-spare count relay 185 has opened the relay switch 252 and all the contacts on the motor scoring disc 99 that are in circuit to the scoring step-up units and which would be energized when engaged by arm R are dead. Arm U will engage the contacts 2 and in turn energize the score step-up relay 215, ten times, this is in addition to the already scored pin count. The pin count contacts 6—15 are dead and thus unoperative during this cycle and engaged by arm S by reason of open relay switch 254. After arm U has contacted the last of the contacts 2, the arm S will engage contact 16 and energize the score strike-spare reset coil 180, to reset the arm 57 and 58 back to the zero position. The strike-spare count relay 185 is deenergized and its switches 184, 190, 249, 252, 253 and 254 are returned to their normal condition. As the score control relay 236 was energized, the switch bank reset coil 153 was not energized due to the open score control relay switch 156. At the end of this second cycle of the scoring motor following the bowling of a second ball after a strike, the first shot relay switch 208 and the second shot relay switch 213 remain closed thus the scoring motor M will travel through a third revolution. During this third revolution, the wiper arm S will again engage the pin count contacts 6—15 to add the final score count to the score. As wiper arm R engages contacts 31 and 32, the player control relay 163 is energized. Because the scoring control relay 236 was deenergized by the opening of the motor cam switch 165 at the end of the second revolution of the scoring motor, the score control relay switches 156 and 256 are now closed and when the score motor cam AA switch 290 closes, the tenth frame control relay 173 will be energized closing the tenth frame control relay switch 177 energizing the frame step-up coil 162 indicating the game is ready for play in the next frame. The switch bank reset coil 153 will be energized when the cam motor switch 155 is closed and the circuit will be returned to its original condition.

The next scoring circuit would result in a spare following an indicated strike. Under these circumstances, a strike has been scored, therefor the wiper arms 75 of the strike-spares step-up units are on their second contact. On the first ball in the next frame after the scoring of the strike, the wiper arms will move to their first position, no scoring being indicated and no change in the circuitry being effected. Upon the bowling of the second ball, all the pin relays 204 are energized and therefore the 1–10 relay 223 is energized. The wiper arms will move over the motor scoring discs however, no scoring will be indicated from contacts 6—15 and their now closed pin relay switches 214 because the 1–10 relay switch 226 is now open. The 1–10 relay switch 225 is now closed energizing the strike spare step-up relay 232 which in turn closes its relay switch 231, which in turn will energize the strike-spare step-up coil 230, when the wiper arm T engages one of the contacts 17. The wiper arms 75 of the strike-spare step-up units 70 are now on their third contact. Thus both the spare light 234 and the strike light 258 is energized. The wiper arms will continue to rotate over the motor scoring discs and when the wiper arm R engages contacts 21—28, the strike-spare count step-up relay 243 will be energized. The energization of this relay 243 will close the step-up relay switch 242 thereby energizing the score strike-spare count step-up coil 241 moving the wiper arms 57 and 58 thereof to their first contact. As the motor continues to rotate the wiper arm R will engage the second set of contacts 21—23 to again energize the strike-spare step-up relay 243 which in turn will energize the score strike-spare count step-up 241 to advance the wiper arms 57 and 58 of the score strike-spare count units 135 and 136 to their second contact. As the wiper arms continue to pass over the motor scoring disc 99, the wiper arm R will engage the contacts 23—28 which in turn will energize the strike-spare step-up units back to their second contact. As the wiper arms continue to move over the motor scoring disc, the arm R will engage contacts 27—30 and as this is a result of the second shot, the second shot relay switch 259 is closed and the strike-spare reset relay 159 will again be energized resetting the wiper arms 75 of the strike-spare step-up units 70 to their number 1 position. The wiper arm R will next engage contacts 31 and 32 thereby energizing the player control relay 163. As the motor and the wiper arms continue to rotate the wiper arm U will engage contact 3 and will now energize the strike-spare count relay 185 and the blow strike-spare count relay 193 through the circuit previously described.

The frame step-up unit relay 162 will not be energized for the reason that the wiper arms 57 and 58 of the strike-spare count units 135 and 136 are now off the zero contact. The motor will continue to be energized, thus moving the wiper arms to their original position ending the first revolution of the motor during the scoring operation. As the strike-spare count relay 185 is energized, the strike-spare count relay switch 249 is closed thus the scoring motor M will be energized to commence a second revolution.

In the second revolution the wiper arms will move over the motor scoring discs and the wiper arm U will continue to engage contacts 18 to register a score. When the wiper arm U engages pin 5, the score strike-spare reset coil 180 will be energized moving the wiper arms 57 and 58 thereof back to the No. 1 position. This through a circuit hereinbefore described. By reason of the wiper arm being on the No. 1 contacts, the contacts 2 connected to line 140 become "hot" and as the wiper arm U engages these contacts, they too will energize the score relay 216 in turn energizing the score step-up relay 215 thus registering the score.

When the wiper arm R engages the contacts 31—32, the player control relay 163 will be energized and the motor and wiper arms will continue to rotate to their original position with the wiper arm U passing over all of the remaining contacts 18 on line 142 so that at this time the score step-up relay 215 has been energized twenty consecutive times indicating a score of 20 for the preceding frame. The circuit is as shown in the figures with exception of the wiper arm on first contact.

*Strike After Strike*

The circuitry for scoring a strike after an indicated strike is as follows: The circuitry is in its original condition with the exception that the wiper arms 75 of the strike-spare step-up units 70 are on their second contact due to the achieved strike. On the first ball in the next frame, the scoring motor M will be energized in its normal manner but as all the pin relays 204 are energized they will in turn close all the relay switches 205 thereby energizing the 1–10 relay 223. Energization of the 1–10 relay 223 will open the 1–10 relay switch 226 interrupting any circuit to the contacts on the motor scoring disc 99 which would result in energizing a score. The relay 223 will also open the 1–10 relay switches 227, 228, and 229. The relay 223 will close the 1–10 relay switch 225 which as hereinbefore explained, is in circuit with the contacts 17 on the motor scoring disc through line 233. Thus as the motor is energized and the wiper arms of the motor scoring disc commence rotation thereover, the arm T will engage the first contact 17 thereby energizing the strike-spare step-up relay 232. As the 1–10 relay switch 224 is closed by energization of the relay 223, the motor will operate through the complete 360° cycle. In so doing the wiper arm T will move past its first position and engage the second contact 17 again energizing the strike-spare step-up relay 232. The energization of said relay 232 has now caused the advancement of the wiper arms 75 of the strike-spare step-up units 70 to move from the second contact to the fourth contact. By reason of the now open 1–10 relay switches 228 and 229 no scoring will be indicated. The player control relay 163 will be energized in its normal manner when the wiper arm R engages contacts 31 and 32 thus closing the player control relay switch 170 energizing the frame step-up coil 162 advancing the wiper arms 47 and 48 of the frame step-up one step indicating the scoring of a double strike and the conditioning of the circuit for the next ball in the next frame.

If a third strike is scored, the following procedure takes place, noting however that in regulation scoring, when a third strike is achieved in the third successive frame, a score of 30 will be indicated in the frame registering the first strike.

The circuit for indicating and scoring the third strike is as follows:

The circuit has been placed in its original condition with the exception that the wiper arms 75 of the strike-spare step-up units are on their fourth contact as a result of the two strikes scored. Upon energization of the scoring motor M in the normal manner, the wiper arms will commence to rotate over the motor scoring disc. The arm R will engage the contacts 19—24 but by reason of the open 1–10 relay switch 228, no circuit is established therethrough. The arm T will engage the contact 17, energizing the strike-spare step-up relay 232, energizing the coil 230 moving the wiper arms 75 thereof onto their fifth contact.

As the motor continues to rotate, the wiper arm T will engage the second contact 17 and again cause energization of the strike-spare step-up relay 232, but as there is no need for a sixth contact as hereinbefore explained, the wiper arms 75 of the step-up unit will remain on the fifth contact. Wiper arm R will then engage the first set of contacts 21—26, energizing the strike-spare count step-up relay 243 to advance the wiper arms 57 and 58 of such relay to their first contact. Wiper arm R will engage the second contacts 21—26 to again energize the relay 243, advancing the wiper arms 57 and 58 to the second contact. Arm R will engage the third and fourth set of contacts

21—26, thereby advancing the wiper arms 57 and 58 to their fourth contact. As the motor continues to rotate, the arm U will engage contact 4, energizing the score strike-spare count reset coil 180, moving the wiper arms 57 and 58 of the strike-spare count units 135 and 136 back to their third position. Wiper arm R will engage contacts 23—26 to reenergize the strike-spare reset coil 159 to move the wiper arms 75 of the strike-spare step-up unit 70 back to their fourth contact. The wiper arm U will engage contact 3, causing energization of the strike-spare count relay 185. Meanwhile arm T has begun to engage contact 18 and because wiper arm 58 is on the 3 or 4 contact of the score strike-spare count unit 136 the score relay 216 will be energized as well as the score step-up coil 215 to commence indicating a score.

The wiper arms and the scoring motor will return to their original position; however, as the strike-spare count relay 185 is energized, the strike-spare count relay switch 149 is closed and the scoring motor M continues to be energized. When the strike-spare count relay 185 was energized, it opened a strike-spare relay switch 252. The opening of this switch breaks the circuit to the contacts of the motor scoring disc 99 which are engaged by arm R. Before the end of the first revolution of the motor M, when the last contact 18 is engaged by wiper arm T, the wiper arm S will engage contact 16 energizing the strike-spare count reset relay 180, moving the wiper arms 57 and 58 thereof back to their second contact. On such second contact, all of the contacts 1 on the motor scoring disc are "hot" and a certain number of them will be engaged by the wiper arm U as it returns to its original position. The wiper arm U continues to engage the contacts 1 on the motor scoring disc, during the second revolution of the motor M and a score of an additional twenty points will be indicated. When the wiper arm U engages the contact 5, the strike spare count reset relay 180 will again be energized, moving the wiper arms 57 and 58 of the strike-spare count relay units 135 and 136 back to their first contact. With the wiper arms 57 and 58 on the first contact, the contacts 2 on the motor scoring disc are "hot" and will be engaged by the wiper arm U to register an additional score of ten more, making a total score of thirty points registered in the frame where the first strike had been indicated.

As the wiper arm U passes off the last of the contacts 2, the wiper arm S will engage contact 3, thereby causing the wiper arms 57 and 58 of the strike-spare count units 135 and 136 to return to their zero position, thus deenergizing the strike-spare count relay 185 so that when the scoring motor returns to its original position, it will become deenergized by reason of the fact that the strike-spare count relay switch 149 is now open. Before the end of the second revolution, arm R will engage contacts 31—32 energizing the player control relay 163 resulting in energizing the frame step-up coil 162. As the score control relay 236 was never energized, when the motor cam AB switch 155 was closed, the bank reset coil 153 was energized resetting the 1–10 relay switches back to their normal condition. We have achieved a third consecutive strike and have indicated a score of thirty and have conditioned the circuit so that it will now indicate the presence of two consecutive strikes plus the achieved score.

In a normal regulation bowling game, the scoring situation in the tenth frame provides that a bowler may be entitled to additional opportunities to bowl upon the achieving of either a spare or a strike. The achieving of a spare in the tenth frame entitles the bowler to one additional ball; the achieving of a strike entitles the bowler to two additional balls. It is readily apparent therefore that before the scoring of a regulation bowling game is completed, the heretofore score indicating circuitry must be continued beyond a normal tenth frame ending.

In the event that the bowler achieves a pin count in the tenth frame, the circuitry will be energized in a manner hereinbefore made apparent and when the tenth frame step-up coil 162 is energized in the usual manner, the wiper arms 47 and 48 of the frame step-up unit 46 will advance to their eleventh position. The arm 48 in such eleventh position will energize the game-over relay 45 while the arm 47 will energize a game-over light 291.

In the event that the player achieves a spare in the tenth frame, the circuit is as follows:

On the first ball in the tenth frame, the scoring motor M will be eneirgzed in a manner hereinbefore described. Upon the bowling of the second ball, the 1–10 relay 223 was energized. The energization of this 1–10 relay 223 opens a 1–10 relay switch 284. As the motor M is energized by the second ball, the wiper arms will move from their "1st" position and arm T will engage contact 17. This will energize the player strike-spare step-up relay 232. The energization of the player strike-spare step-up relay 232 will close a strike-spare step-up relay switch 270. This latter relay switch 270 is in circuit to a tenth frame step-up coil 271. When the wiper arm 48 of the frame step-up unit is on its tenth contact and the relay switch 270 is closed as here explained, the tenth frame step-up coil 271 is energized moving the wiper arm 59 of the tenth frame step-up unit 124 to the first contact. However, in order to end the scoring of the game, the tenth frame control relay 173 must be energized. Such tenth frame control relay 173 will not be energized when the cam AA motor switch 290 is closed by reason of the now open 1–10 relay switch 284 which is in circuit with the first contact on the tenth frame step-up unit 124.

When the tenth frame step-up coil 271 was energized it caused the wiper arm 59 to move to the first contact on the tenth frame unit 124, and as the 1–10 relay switch 284 was opened the tenth frame control relay 173 was not energized.

As the tenth frame control relay 173 is not energized the tenth frame control relay switch 177 is not closed, and therefore the frame step-up coil 162 is not energized and the player is entitled to one additional ball. The bowling of the one additional ball in the tenth frame will close the first shot relay 206 which in turn will close a first shot relay switch 282. If in bowling this additional ball, the player does not achieve a strike, the 1–10 relay switch 284 will be in its normal closed position and therefore when the motor cam AA switch 290 is closed, the tenth frame control relay 173 will be energized closing the tenth frame control relay switch 177 permitting the frame step-up coil 162 to be energized ending the game. The scoring of the tenth frame spare and the pin count which was a result of the additional ball was over the same circuitry as hereinbefore described.

In the event that on the first ball in the tenth frame, the player achieves a strike, the tenth frame step-up coil 271 will be energized twice causing the wiper arm 59 to be moved to the second contact on the tenth frame step-up unit 124. The conditioning of the circuit will be the same as in achieving a strike as hereinbefore explained with the exception that the 1–10 relay switch 284 which is in circuit to the tenth frame control relay 173 is now open. The bowler is entitled by such strike to two additional balls.

Let us assume that on the first of the two additional balls, the player scores less than a strike. The first shot relay 206 is energized, and the motor M is energized to move the wiper arms to their "1st" position. The first shot relay switch 282 is closed. On the second of the additional shots, the second shot relay 207 is closed, closing its second shot relay switch 283 and as less than all the pins are down the relay 223 is not energized and by reason of the open 1–10 relay switch 225 the player strike-spare step-up relay 232 will not be energized, the strike-spare step-up relay switch 270 will not be closed and the tenth frame step-up coil 271 will not be energized. The arm 59 of the tenth frame unit 124 will remain on its second contact and when the cam motor switch 290 is closed after the proper score has been registered as hereinbefore explained in the strike circuitry followed by a pin count, the tenth frame control relay 173 will be energized causing the game to end.

Let us now assume that after the player has achieved a strike on the first ball in the tenth frame, he achieves a spare on the next two additional balls to which he is entitled. On the bowling of the first ball, the motor M will be energized in its normal manner moving the wiper arms of the motor scoring disc 99 to their "1st" position. The first shot relay 206 will be energized closing the first shot relay switch 282. Upon the bowling of the second additional ball in the tenth frame, the 1–10 relay 223 will be energized opening the 1–10 relay switch 284. When the wiper arm T engages contacts 17, the player strike-spare step-up relay 232 will be energized, closing its relay switch 270 energizing the tenth frame step-up coil 271 thus moving its wiper arm 59 from the second contact to the third. After the scoring as hereinbefore explained ending the scoring of a spare following a strike, the tenth frame control relay 173 will be energized bringing about the end of the game.

Assuming now that the player after achieving a strike on the first ball in the tenth frame is successful in achieving the second strike on the first of the additional balls to which he is entitled. As the second strike was achieved on the first ball, the first shot relay 206 was energized closing its first shot relay switch 282. The 1–10 relay 223 was energized opening its relay switch 284. As the scoring motor M is energized, it will move the wiper arm T into engagement with the contacts 17 causing the tenth frame step-up coil 271 to be energized twice, moving its wiper arm 59 to the fourth contact. It should be noted that when the wiper arm 59 is on the fourth contact, the opening of the 1–10 relay switch 284 will prevent the tenth frame control relay 173 from becoming energized. As the second strike in the tenth frame was the result of the first additional ball to which the bowler was entitled he is permitted to bowl one additional ball. Here again two scoring situations may develop, he may either score a third strike or get a pin count.

In the event the bowler after scoring two strikes in the tenth frame, and on the last ball of the game, the bowler does not achieve a third strike, the 1–10 relay switch 284 will remain closed and as the wiper arm 59 of the tenth frame unit 124 is on the fourth contact when the first shot relay switch 282 is closed, the tenth frame control relay 173 will be energized when the cam motor switch 290 is closed thereby ending the game.

In the event that the bowler on the last ball of the game achieves a third strike, the tenth frame step-up coil 271 will be energized twice as the strike-spare step-up relay switch 270 is closed twice in the manner hereinbefore explained, to step-up the wiper arm 59 to the sixth contact of the tenth frame unit 124. Notwithstanding that the 1–10 relay switch 284 is closed, the tenth frame control relay 173 will be energized to end the game when the cam motor switch 290 is closed by reason of the fact that the sixth contact on the tenth frame unit is in a circuit which by-passes the now open 1–10 relay switch 284.

As the tenth frame control relay 173 is energized after the scoring of the circuitry in the manner hereinbefore explained, the frame step-up coil 162 will be energized stepping the wiper arms 47 and 48 of the frame step-up unit 46 on to the eleventh contact. This will energize the game over relay 45 and will also cause illumination of the game over light 291. Before the circuit is again conditioned, the resetting process as hereinbefore explained must be completed.

The foregoing description of the circuitries has been based upon the consideration that there was but one player. To adapt the circuitries for use when there is a multitude of players, I have provided a player selector switch 72. As it is normal to have five members on a bowling team, I have provided this switch with five contacts. As the switch 72 is manually set, it can then accommodate any number of players 1–5. The selector switch 72 will move its wiper arm over a switch contact disc 73. This switch contact disc 73 is connected to the player control unit 76. For an example, let us say that we have three players involved. The wiper arm of the player selector switch 72 will be on contact three thereof.

In the playing of the circuit, in order to complete a circuit to the frame step-up coil 162, a player control relay switch 170 had to be closed. This player control relay switch 170 was closed when the player control relay 163 was energized. This player control relay 163 was energized when the wiper arm R engaged contacts 31 and 32 on the motor scoring disc. However, unless the wiper arm of the player selector switch 72 of the player control unit 76 are on identical contacts on each unit respectively, the player control relay 163 will not be energized. In the event that the player control relay 163 is not energized, the play control step-up coil 172 will be energized through the player control relay switch 171 when the tenth frame control relay switch 177 is closed in a manner hereinbefore described. The energization of the player control step-up coil 172 will move the wiper arm 71 of the player control unit 76 over their respective contacts. We have assumed that there are three players playing. Thus when the wiper arm 71 of the player control unit 76 is stepped-up to the third contact, the player control relay 163 will be energized in a manner hereinbefore described. The energization of the player control relay 163 will break the player control relay switch 171 disrupting any circuit to the player control step-up coil 172 and makes the player control relay switch 170, permitting the frame step-up coil 162 to be energized as hereinbefore explained. The heretofore described circuitries will function in the same manner and will result in the same scoring operation.

Figure 2:
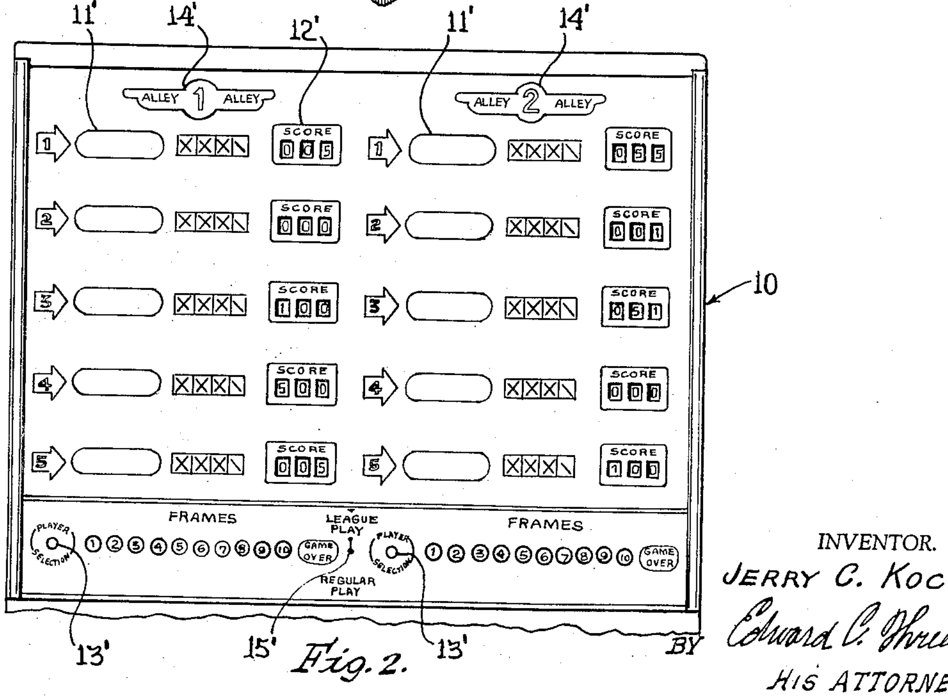
FIG. 2 is a fragmentary front elevational view of the indicating surface of the scoring cabinet.
Figures 3, 4:
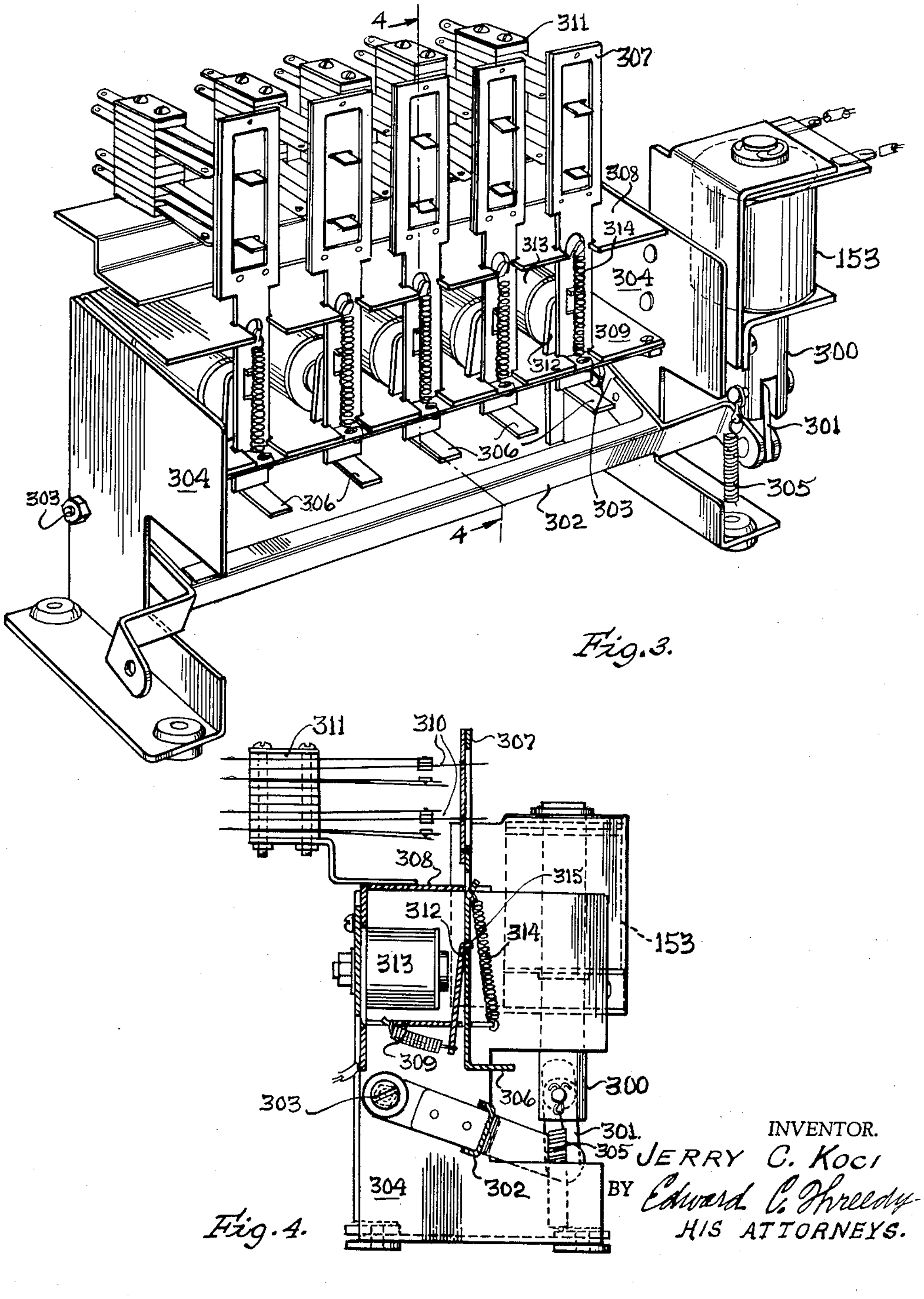
FIG. 3 is a perspective view of a switch resetting mechanism employed in the circuit.
FIG. 4 is a fragmentary detail sectional view taken on line 4—4 of FIG. 3.

Referring to FIGURES 3 and 4 of the drawings, I have illustrated a mechanism for resetting a bank of switches. This mechanism includes a relay 153'. This relay 153' has a movable armature 300 adaped to be pulled into the relay 153 when the same is energized. The armature 300 through linkage 301 is connected to a resetting bar 302. This resetting bar 302 is pivotally connected as at 303 to vertical side walls 304 of a mounting bracket. A spring 305 normally holds the armature 300 in its extended position with respect to the relay 153. The resetting bar 302 is adapted to engage horizontal extending flanges 306 of a switch actuating member 307. This switch actuating member 307 is slidable vertically with respect to spaced apart horizontal walls 308 and 309 of the mounting bracket. One end of the switch actuating member 307 is fixedly connected to movable spring leaves 310 of a switch structure 311. To maintain the switch actuating member 307 in its vertical upper most position with respect to the walls 308 and 309, I provide a pivotal latch 312. This pivotal latch 312 is carried by the lower most wall 309 as viewed in FIG. 4. The latch 312 is in reality an armature plate of a solenoid 313. Thus when the solenoid 313 is energized, the latch plate 312 is drawn thereto out of latching engagement with the switch actuating member 307. Due to spring 314, the switch actuating member 307 will fall downwardly until its flange 306 engages the bar 302. When the actuating member 307 is raised by the action of the bar 302 and the solenoid 313 is deenergized, the switch actuating member 307 wil be moved upwardly until the latch plate 312 engages the aperture 315 formed in the member 307. As clearly illustrated in FIGS. 1 and 2, the scoring cabinet is to be employed in connection with two alleys. Referring to FIG. 2, it will be seen that after bowler number 1, on alley 1, finishes his bowling operation, any scoring circuit connected with his score should be disrupted.

This will be accomplished by the energization of the solenoid 313 as seen in FIG. 4. It should be noted at this time that in FIGS. 3 and 4, the mechanism includes a series of five switch structures 311, there being a switch structure for each of the five players on the bowling alley. It should also be noted that each of these switch structures 311 is of the make and break type and therefor when the movable spring leaves 10 are moved there will energize a circuit to the lower most switches of the switch structure 311, are each associated with each of the five players on alley 1, and the lower most switch structure of switch structure 311 is associated with each of the five players on alley 2. Thus when the first player on alley 1 completes his bowling cycle and the solenoid 313 is energized, the switch actuating member 307 is released and will condition the scoring circuit for the player on alley 2. The same operation will follow through each of the five switch structures 311. When the fifth player on the second alley has completed his score, the relay 153 will be energized resetting the switch actuating member 137 and resetting each of the switch structures 311.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

An automatic scoring mechanism for scoring regulation bowling comprising an electric circuit, (*a*) a scoring motor in said circuit including first and second ball switches each energizing said motor for a predetermined period of time, (*b*) a score conditioning disc upon which is circumferentially arranged a plurality of circles of electrical contacts, (*c*) a plurality of wiper arms each of a different length rotatably carried by said scoring motor and adapted to move in unison in one direction over said disc with said wiper arms so radially related one to another so as to successively complete different scoring circuits as said arms each engage different contacts thereon, (*d*) said circuit including a score accumulating circuit having a plurality of score conditioning step-up relay units connected to a plurality of grouped contacts of different circles on said disc, (*e*) one of said arms adapted to bridge said grouped contacts of different circles of contacts on said disc for completing a circuit to said score conditioning step-up relay units, (*f*) a score registering circuit including selective contacts of selective circles of said circles of contacts on said disc and switch means operatively responsive to the absence of any standing bowling pins and said first and second ball switches for energizing said motor so as to move said wiper arms over said disc so as to register an unaccumulated attained score, (g) a holding circuit including switches of said step-up relay units connected in series to certain contacts in one of said circles of contacts and switch means operatively responsive to the absence of all standing bowling pins for energizing said motor independently of actuation of said first and second ball switches so as to move said wiper arms over said disc a pre-determined number of times corresponding to an accumulative score that is to be registered, (*h*) a frame indicating means in said score accumulating circuit and adapted to be actuated thereby after any accumulated score has been registered by said score registering circuit, (i) a player indicating means for alternately conditioning for actuation said score accumulating circuit and said score registering circuit between competing players, (j) and a game over circuit energized by a predetermined condition of said frame indicating means to successively de-energize said score accumulating circuit and said score registering circuit.

References Cited in the file of this patent

UNITED STATES PATENTS

| | | |
|---|---|---|
| 966,252 | Smiley | Aug. 2, 1910 |
| 2,223,255 | Koci | Nov. 26, 1940 |
| 2,590,444 | Millman et al. | Mar. 25, 1952 |
| 2,643,884 | Koci | June 30, 1953 |
| 2,652,252 | Alexander | Sept. 15, 1953 |
| 2,821,395 | Dumas | Jan. 28, 1958 |